US007246183B2

(12) United States Patent
Covington et al.

(10) Patent No.: US 7,246,183 B2
(45) Date of Patent: Jul. 17, 2007

(54) PHASE OPTIMIZATION FOR WIRELESS KVM TRANSMISSION

(75) Inventors: C. David Covington, Fayetteville, AR (US); Charles Lally, Vista, CA (US); Sheng Li, San Diego, CA (US); Richard L. Moore, Escondido, CA (US); Iain Huntly-Playle, La Jolla, CA (US)

(73) Assignee: Avocent California Corporation, Escondido, CA (US)

( * ) Notice: Subject to any disclaimer, the term of this patent is extended or adjusted under 35 U.S.C. 154(b) by 456 days.

(21) Appl. No.: 10/947,163

(22) Filed: Sep. 23, 2004

(65) Prior Publication Data

US 2005/0108451 A1   May 19, 2005

Related U.S. Application Data

(60) Provisional application No. 60/519,610, filed on Nov. 14, 2003.

(51) Int. Cl.
*G06F 13/00* (2006.01)
*G06F 15/16* (2006.01)
*H03L 7/00* (2006.01)

(52) U.S. Cl. .......................... 710/62; 710/68; 710/69; 709/247

(58) Field of Classification Search ............... None
See application file for complete search history.

(56) References Cited

U.S. PATENT DOCUMENTS

| 6,701,380 B2 * | 3/2004 | Schneider et al. ......... 709/250 |
| 2004/0042547 A1 * | 3/2004 | Coleman .............. 375/240.01 |
| 2005/0114894 A1 * | 5/2005 | Hoerl ........................ 725/74 |

* cited by examiner

*Primary Examiner*—Ilwoo Park
(74) *Attorney, Agent, or Firm*—Davidson Berquist Jackson & Gowdey LLP

(57) ABSTRACT

In a wireless keyboard-video-mouse ("KVM") system in which a remote computer accesses the video output data of a target computer, a method of providing video data from the target computer to the remote computer, includes obtaining an analog video signal from a target computer; disabling data compression of the video signal; determining a first phase (P) for analog-to-digital (A/D) conversion of the video signal; beginning compression of the video signal; and adjusting the first phase of the A/D conversion to produced a second phase (P'), based, at least in part, on a number of segments required to transmit the compressed video signal.

5 Claims, 6 Drawing Sheets

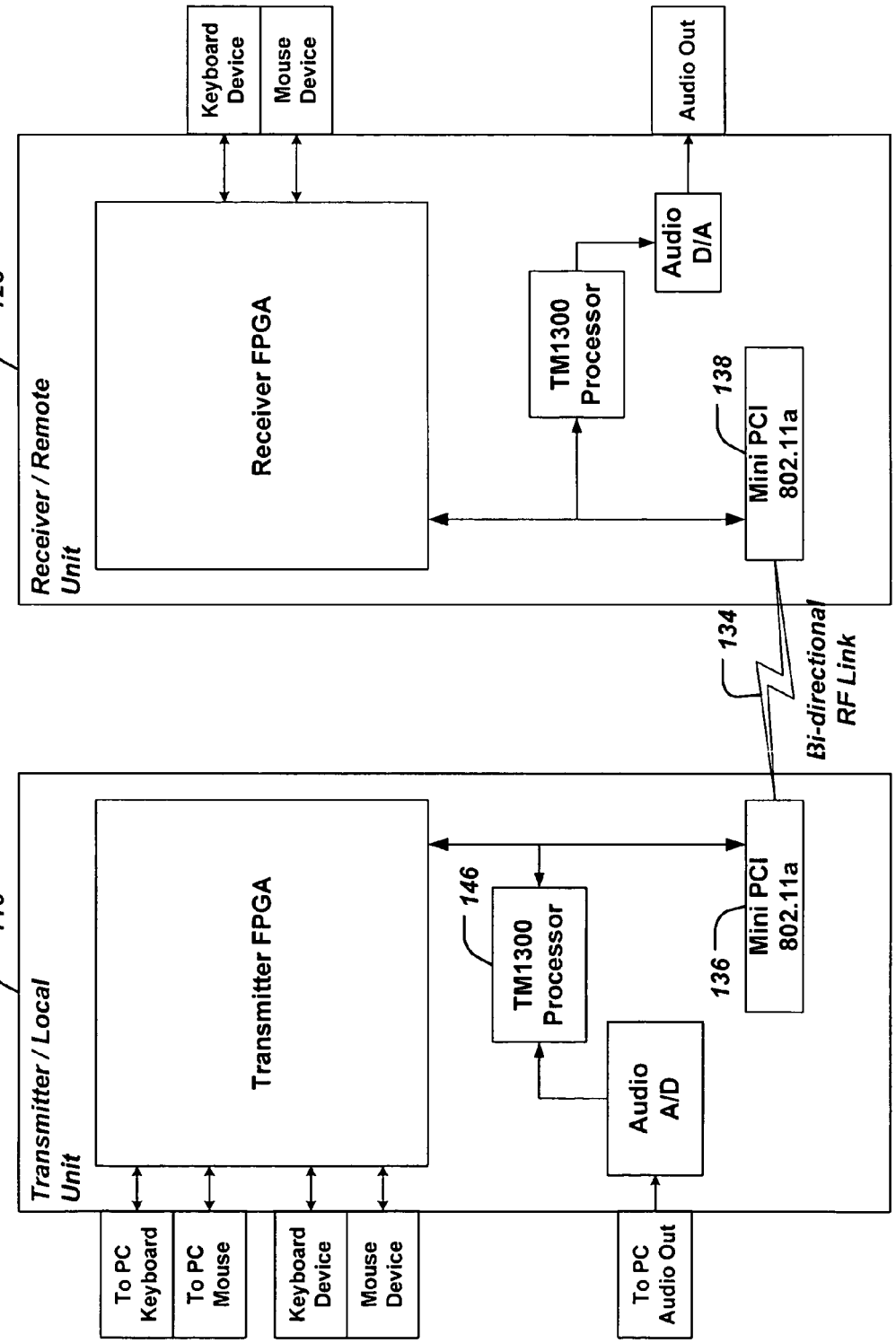

PHASE OPTIMIZATION FOR WIRELESS KVM TRANSMISSION

RELATED APPLICATIONS

This application is related to and claims priority from U.S. Provisional patent application No. 60/519,610, filed Nov. 14, 2003, the contents of which are incorporated herein by reference; and from U.S. patent application Ser. No. 10/883,993, filed Jul. 6, 2004, the contents of which are incorporated herein by reference.

FIELD OF THE INVENTION

This invention relates to the field of computer data processing, and, more specifically, to data processing using wireless-based keyboard-video-mouse ("KVM") systems.

BACKGROUND

Systems exist to facilitate remote control of and access to a computer by an operator at a remote station. Such systems typically use a device or mechanism that enables an operator at a remote station to control aspects of a so-called target (or local) computer. More particularly, such systems typically allow a remote station to provide mouse and keyboard input to the target computer and further allow the remote station to view the video display output, and hear the audio output of the target computer. These types of systems are typically called keyboard-video-mouse (KVM) systems.

Traditional KVM systems rely on wired technology to connect remote and target computers. It is, however, sometimes desirable to allow wireless connection between remote stations and target computers (included as part of a target system). For example, in addition to minimizing the number of actual wires needed in a KVM system, a wireless KVM system allows for target systems and remote stations to be added to the system without the addition of switches or wires.

In order for a remote computer to control the operation of a target computer, it is desirable that the video display of the remote computer keep up, in essentially real-time, with the display of the target computer. It is further desirable for a remote computer or system to be able to switch rapidly between different target systems. However, each target system is potentially different from each other such system. In particular, different target systems may have different types of video output. Also, large amounts of data are required to keep the remote computer's video display current. Accordingly, it is desirable to efficiently compress the video data being sent from the target computer to the remote computer in a manner that both presents an acceptable image to the target display and, at the same time, does not create significant delay between the creation and transmission of the video data.

BRIEF DESCRIPTION OF THE DRAWINGS

Exemplary embodiments of the invention are illustrated in the accompanying drawings in which like references indicate similar or corresponding elements and in which:

FIGS. 1(a)–1(c) are schematic representations of exemplary embodiments of the present invention;

DETAILED DESCRIPTION OF PRESENTLY PREFERRED EXEMPLARY EMBODIMENTS OF THE INVENTION

Figure 1A:
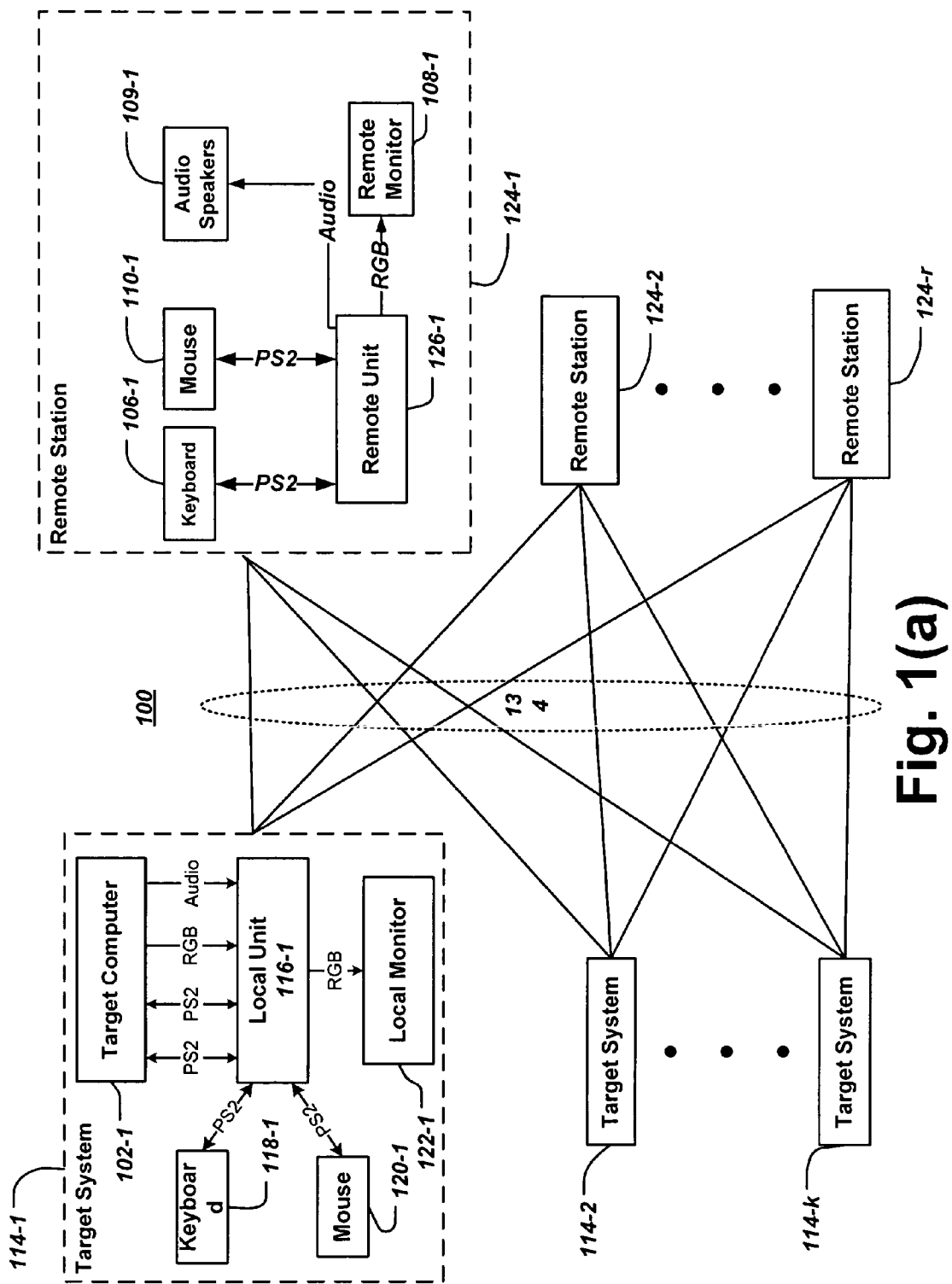

A typical KVM system 100 according to embodiments of the present invention is shown in FIG. 1(a), where one or more target systems 114-1 . . . 114-k are controlled or accessed by one or more remote stations 124-1, 124-2, . . . , 124-r (generally 124). Each target system 114 includes a target computer 102 with associated and attached local unit 116. Each remote station 124 generally includes a remote unit 126, a keyboard 106, a video monitor 108, audio speakers 109 and a mouse (or similar point-and-click device) 110, although some remote stations may only include a video display 108 and a remote unit 126 or audio speakers 109 and a remote unit. (For reference, the remote unit, audio speakers, keyboard, mouse and video monitor of the remote station 124-x are referred to as remote unit 126-x, keyboard 106-x, monitor 108-x, audio speakers 109-x, and mouse 110-x respectively.) Operation of a particular target computer 102-i may be remotely viewed on the video monitor 108 of any of the remote stations 124, the audio heard on the speakers 109 of a remote station, and the keyboard 106 and mouse 110 of the remote station 124 may be used to provide keyboard and mouse input to the target computer 102-i. As shown in FIG. 1(a), in a typical KVM system 100 according to the present invention, a remote station 124 is able to control or access more than one target computer. Note that the lines drawn between target systems and remote stations in FIG. 1(a) represent potential (and not necessarily actual) wireless (RF) links between those sides. Thus, each target computer 102 may be controlled or accessed by more than one remote station 124, and each remote station 124 may control more than one target computer 102. The remote station, in a typical system, may be located within several hundred feet of the target system.

The present invention provides wireless KVM systems and mechanisms that support such systems. In the discussion that follows, the computer or system being controlled or accessed is generally referred to as the target computer or the target system. In some instances, the target computer is also referred to as the local computer. The system that is being used to access or control the target (local) computer is generally referred to herein as the remote system. For convenience of description, components on or connected directly to the target computer are referred to herein as "local", whereas components that are on or connected directly to the remote system are referred to herein as "remote." Additionally, as used herein, in certain contexts, the target system is considered to be a video transmitter or sending unit, and the remote system is the video receiving unit or receiver, although both units transmit and receive. Video and audio travel from target system to remote station, while keyboard and mouse data move from remote station to target system.

As shown in FIG. 1(a) the local or target system 114 includes a target computer 102 and an associated local unit 116. The local system 114 may also include a keyboard 118, a mouse (or other point-and-click-type device) 120 and a local monitor 122, each connected to the local unit 116 directly. The remote station 124 includes a remote unit 126. Additionally, the remote station 124 includes a keyboard 106, a mouse (or other point-and-click-type device) 110, a remote monitor 108 and a set of stereo audio speakers 109 The local or target computer 102 may be a computer, a server, a processor or other collection of processors or logic elements. Generally, as contemplated by the inventors, and as one skilled in the art would recognize, a target computer may be any processor or collection of processors. By way of example, a target computer may be a processor or collection of processors or logic elements located (or embedded) in a server, a desktop computer (such as a PC, Apple Macintosh or the like), a kiosk, an ATM, a switch, a set-top box, an appliance (such as a television, DVR, DVD player and the like), a vehicle, an elevator, on a manufacturing or processing production line. A collection of target computers may, e.g., be a collection of servers in a rack or some other collection, they may be independent of each other or connected to each other in a network or by some other structure. The local and remote monitors 122, 108, may be digital or analog.

The local unit 116 is a device or mechanism, e.g., a printed circuit board ("PCB"), that is installed locally to the target/local computer 102. This device may be close to, but external to the computer, or may be installed inside the computer's housing. Regardless of the positioning of the local unit 116, there will preferably be a direct electrical connection between the target computer 102 and the local unit 116.

Various components on the local/target system 114 communicate wirelessly with components on the remote station 124 via a wireless connection link 134. The wireless connection or link 134 preferably follows the IEEE 802.11a standard protocol, although one skilled in the art will realize that other protocols and methods of wireless communication are within the scope of the invention.

The local unit 116 receives local mouse and keyboard signals, e.g., as PS2 signals. These signals are provided by the local unit 116 to the target computer 102. The target computer 102 generates video output signals, e.g., RGB (Red, Green, Blue) signals, which are provided to the local unit 116 which, in turn, provides the signals to drive the local monitor 122. The target computer 102 may also generate audio output signals which are provided to the local unit 116. As noted, the target computer 102 need not have a keyboard, mouse or monitor, and may be controlled entirely by a remote computer.

Local unit 116 transmits image and audio data for transmission to a remote station (e.g., remote unit 126). Some or all of the data may be compressed before being transmitted. Additionally, local unit 116 may receive mouse and keyboard data (from a remote station), which is then provided to the local/target computer 102. The target computer 102 may execute the data received and may display output on its local monitor 122.

The remote station 124 receives video data from the local unit 116 of the target computer 102, preferably wirelessly (e.g., via an 802.11a wireless connection 134). The remote unit 126 receives (possibly compressed) video and audio data (not all of the data need be compressed) from the local unit 116. The remote unit 126 decompresses (as necessary) the video and audio data from the local unit 116 and provides it to the appropriate rendering device, e.g., to the remote monitor 108, which displays the video data, and to the remote speakers 109, respectively. Additionally, remote mouse 110 and keyboard 106 may be used to generate appropriate signals (e.g., PS2 signals) that may be transmitted via remote unit 126 to local unit 116 for execution on target computer 102.

Figure 1B:
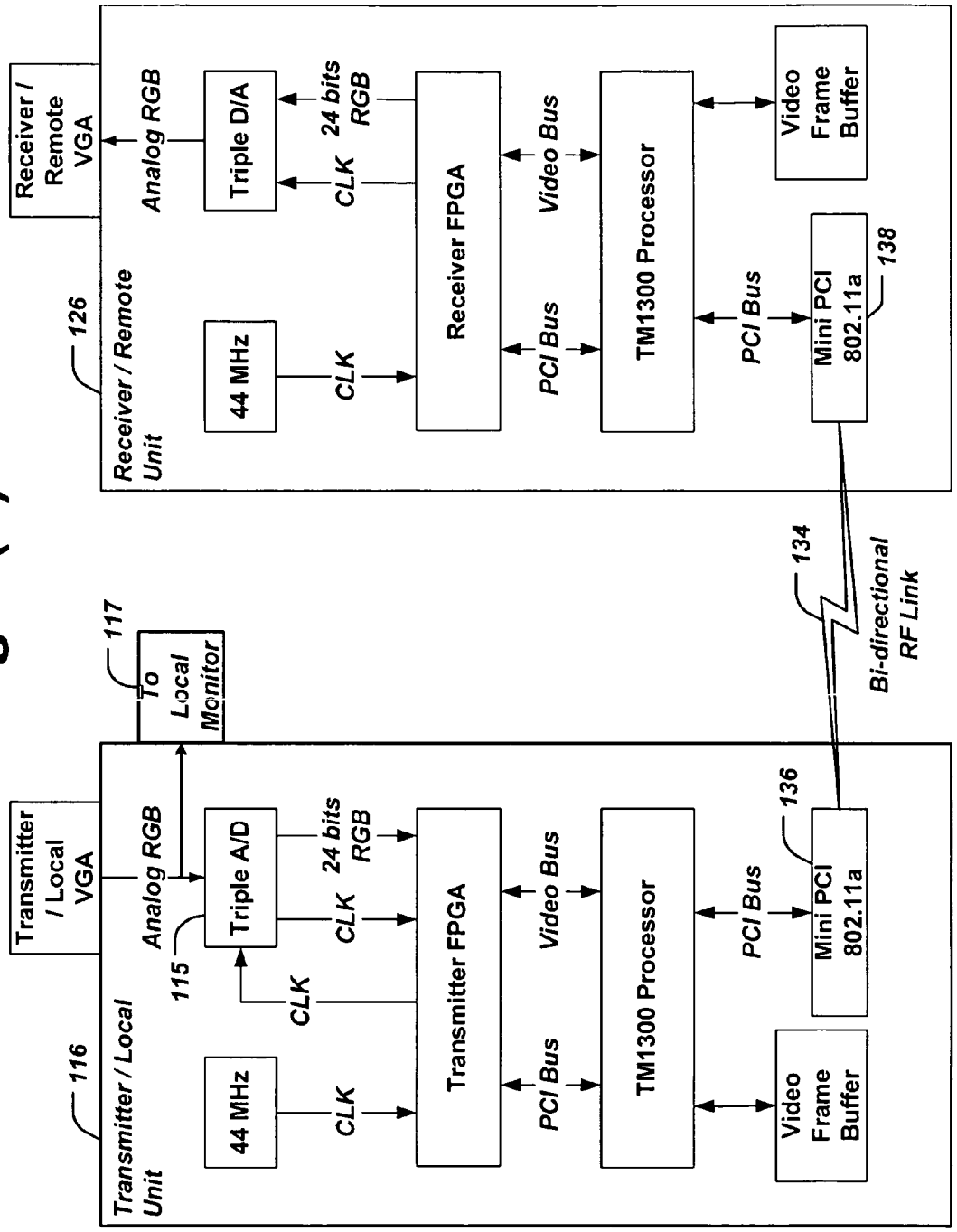

FIG. 1(b) is a block diagram depicting aspects of a video system according to embodiments of the present invention, indicating transmitter (local) unit 116 and receiver (remote) unit 126. FIG. 1(c) is a block diagram showing aspects of a keyboard, mouse, and audio system according to embodiments of the present invention for the local and remote units 116, 126, respectively.

With reference to FIGS. 1(b)–1(c), in operation, the system transmits video and possibly audio signals from an attached computer 102 from the transmitter (local) unit 116 to a receiver (remote) unit 126. In presently preferred embodiments, the units are in range of an 802.11a wireless radio link 134 between their respective wireless (Mini PCI 802.11a) cards 136 and 138. Those skilled in the art would understand that different types of wireless links will give different acceptable distance ranges. The system also communicates keyboard and mouse control information from the receiver/remote unit 126 back to the transmitter/local unit 116. Keyboard and mouse connections at the transmitter allow control of the computer 102 at the transmitter unit as well as the receiver unit. In addition, there may be a monitor port 117 on the transmitter to view the video signal before transmission.

The transmitter/local unit 116 attaches to a computer 102 via video and audio output connectors and keyboard and mouse input connectors as indicated in FIG. 1(c). Local unit 116 and remote unit 126, via wireless link 134, provide a path for keyboard and mouse control signals to flow from keyboard device and mouse device ports on remote unit 126 to the corresponding ports on local unit 116 connected to target computer 102. In addition, local unit 116 and remote unit 126, via wireless link 134, provide a channel for analog audio information to flow from target computer 102 through local unit 116, wireless link 134, remote unit 126, connecting to the audio out port of remote unit 126. The audio out port drives an attached speaker as if it were connected to target computer 102.

The transmitter 116 digitizes and compresses the analog video input to reduce radio bandwidth requirements. Details of the various compression algorithms used by various embodiments appear in co-pending application Ser. No. 10/883,993, filed Jul. 6, 2004, the contents of which are incorporated herein by reference and in co-pending application Ser. No. 10/947,191, still pending, the contents of which are also incorporated herein by reference. In some embodiments, compression occurs pixel to pixel, with a line-fitting algorithm generating video segments with length up to nine pixels. Compression may also occur between frames such that the transmitter unit sends only the part of a line changed between frames, from the first pixel that is different to the end of the line. A user at the receiver 126 may adjust video parameters either manually or automatically using an On Screen Display (OSD) in the receiver driven by the attached keyboard 106 and mouse 110 and observed on the receiver monitor 108.

Overview

The wireless KVM system (target system 114) digitizes an analog video source from a computer display port, compresses the digital video information, and transmits the video over a wireless link 134 to a remote receiver unit 126, which decompresses the video stream and presents it on a remote display 108. At various times, the system analyzes the input video to determine the correct settings for the A/D converter (115 in FIG. 1(b)) to properly digitize the input signal. Preferred embodiments of the system automatically determine optimized settings for the following parameters: horizontal position, vertical position, brightness, contrast, and phase.

In particular, whenever the remote side detects a disruption of certain key video parameters that may indicate a change in resolution or a change in video source, it triggers the execution of automatic setup (AutoSetup) and automatic phase (AutoPhase) algorithms. Once resolution is initially detected, a routine (TestResolutionChanged) running on the remote side monitors various parameters for changes. In presently preferred embodiments the following three parameters are monitored for changes, namely: Vertical sync polarity; Horizontal sync polarity; and horizontal period (measured in PCI clock cycles). If either sync pulse changes polarity or if the horizontal period changes by some predetermined amount, e.g., more than 40 counts, either higher or lower, then the local concludes that the source has changed and it is necessary to re-run AutoSetup and AutoPhase.

The FPGA provides the above parameters as fast reads of PCI registers. One skilled in the art will realize that many more parameters associated with the video can be monitored, but it takes much more time to read them via the I2C port. One strategy is to amortize this process across frames, cycling through the parameter reading process looking at one parameter per frame. If all the parameters were read in the same frame, it might take so long that the time window for starting a video capture operation might be missed. In such a case the frame rate could drop.

The A/D setup process runs upon the occurrence of several events including initial power-on, change of video source, and change of resolution. In presently preferred embodiments, it runs for approximately one second to set all of the parameters listed above without transmitting any video to the receiver. The receiver simply holds the last video frame received. After parameters are determined, the flow of video frames from the transmitter to the receiver resumes, and the A/D setup process starts a second phase-tuning process before the A/D setup process exits. The initial A/D setup process determines an initial phase setting, which is sufficiently accurate to allow acceptable-quality video to flow from the transmitter to the receiver. The secondary phase-tuning process takes the phase setting produced in the setup process as an initial setting and seeks to optimize it more closely, monitoring effectiveness of compression to further optimize the A/D phase setting.

Thus, as noted, the Autosetup procedure automatically determines settings for Horizontal Position, Vertical Position, Brightness Level, Contrast Level, and Phase Adjustment settings. A preferred embodiment of the Autosetup procedure executes in about eight seconds. Execution time may be reduced to this level, e.g., by not transmitting frames during AutoSetup execution.

The first action of the AutoSetup procedure is to save the frame-to-frame threshold and to set video sampling parameters with values to facilitate locating the left and top edges of the active video region of the input analog video signal. The AutoSetup procedure sets a low value of brightness and a high value of contrast (gain). AutoSetup disables compression to enable efficient analysis of the video as each segment encoded represents only a single pixel. AutoSetup sets the Horizontal Position of the sampling interval of the video A/D to the minimum value so as to position the video as far right as possible. The minimum Horizontal Position value causes video sampling to start almost immediately after the horizontal sync pulse is over. AutoSetup also sets the Vertical Position of the frame sampling interval to minimum A/D sampling offset. If the AutoSetup procedure terminated here and restored the flow of video to the remote, the image would appear shifted right and down.

Detecting and Setting Horizontal Position

Figure 2:
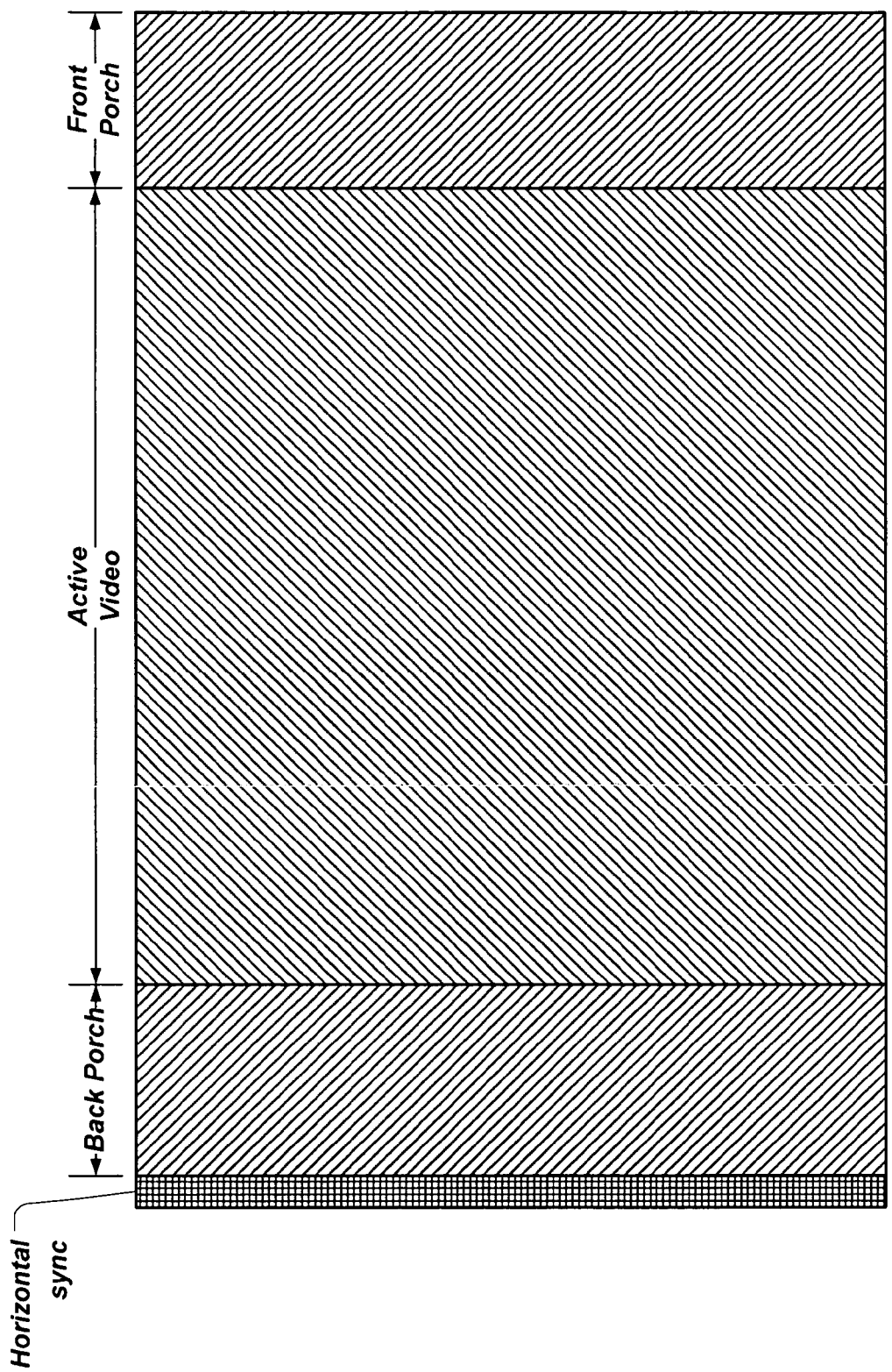
FIGS. 2–3 depict logical layouts of the video display.

FIG. 2 depicts a logical layout of a video frame. In FIG. 2, the back porch interval occurs immediately after each horizontal sync pulse throughout the frame. The FPGA parameter CAPTURE_CONTROL sets Horizontal Position by determining the back porch interval before video sampling begins. The AutoSetup procedure captures the first frame assuming the back porch is zero width. Thus the back porch area is digitized. The algorithm expects it to encode as black. This allows detection of the beginning of video as follows:

The AutoSetup procedure releases control to the main capture loop to capture one frame, which now corresponds to the new display settings. The AutoSetup procedure processes the offset-captured frame by searching all the lines from 25% of the way down the screen to 75% down the screen. One skilled in the art will realize that values other than 25% and 75% may be used in some embodiments. AutoSetup scans each line and detects the first pixel with red, green, or blue value over 25% of maximum value. Again, one skilled in the art will realize that a value other than 25% may be effectively used in some embodiments. Given the absolute coding range of 0–31, this corresponds to the value eight (8). As each line is processed, the minimum trigger horizontal pixel offset is maintained. After the last line at 75% of the way down the screen is processed, AutoSetup accepts the surviving overall minimum pixel trigger offset as the correct offset to synchronize the start of sampling with the start of active video from the video source. This Horizontal Position value is set to the minimum pixel trigger offset just determined.

Detecting and Setting Vertical Position

The AutoSetup procedure returns to cause a single frame to be captured with the updated horizontal offset. AutoSetup then analyzes the video in the same way as before to determine horizontal offset except from the top downward instead of from left to right. AutoSetup searches down from the top of the screen beginning at a pixel 25% of the way across the first line and logs the vertical line offset causing either red, green, or blue to exceed 25% of the maximum color value. The algorithm maintains the minimum value of this vertical offset trigger as it continues until it has proceeded 75% of the way left to right across the display. The algorithm then sets the updated Vertical Position value, adjusts the brightness to the mid-range value and the contrast a little higher than before. Brightness ranges from 0 to 255, so the initial value is 128. It then sets an increment value to 64 and returns to allow a frame to be captured.

Figure 3:
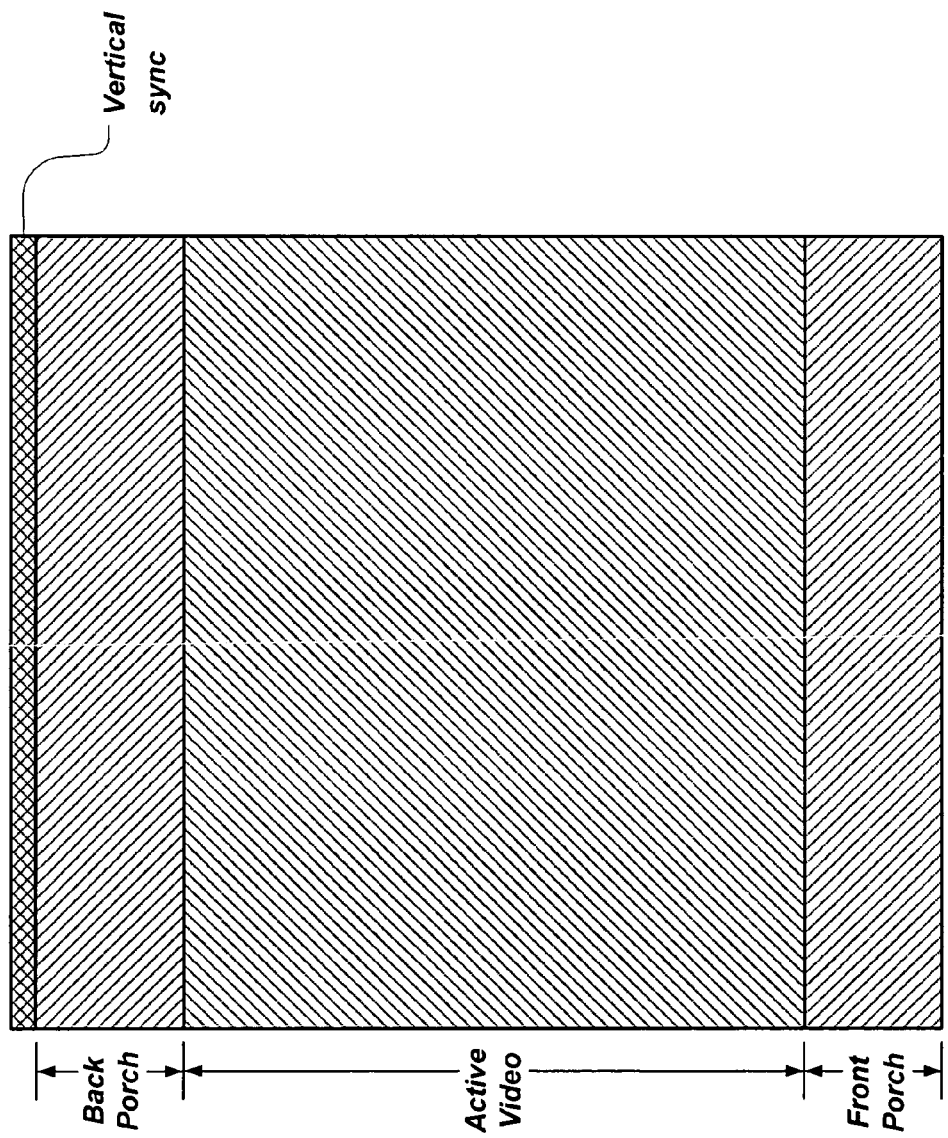

FIG. 3 depicts a logical layout of a video frame, from a vertical perspective.

Brightness

The following sequence is repeated using a binary search to determine the optimum Brightness setting. The metric used is the count of the number of completely black pixels on the left half of the display compared to a threshold of one hundred (100). The pixels on each line that are processed range from offset 5 to the 50% point. This avoids (1) black pixels at the beginning of the line due to misadjusted horizontal offset and (2) analyzing pixels past the end of the FIFO threshold, which is actually around the ⅔ point. The last few lines are not analyzed as a safety factor to prevent possible vertical misalignment issues.

The Brightness level is updated each time according to the threshold comparison. If the threshold is exceeded at any point, the search terminates and the most recent Brightness value is increased by the current increment value. If the entire search area produces less than one hundred (100) black pixels, the threshold is not exceeded and the most recent Brightness value is decreased by the current increment value. In either case, the increment value is divided by two after each iteration.

This process repeats for a total of five passes to determine the correct Brightness setting within an accuracy of 4 counts out of 255. The binary search algorithm reduces worst case execution to five frames. After the last Brightness adjustment, the contrast value is set to a midrange value of 32.

Contrast

The Contrast value ranges from 0 to 63. The contrast increment value is set to 16. After the next frame is captured, the procedure searches the same left-half region of the display, this time determining the number of all-white pixels. If the number of white pixels exceeds 500 at any point, the search terminates and the contrast value is decreased by the current increment value. If the entire search produces less than 500 white pixels, the contrast value is increased by the increment value. This process repeats once for a total of two passes to determine the correct contrast setting within an accuracy of 4.

Phase Optimization

At the end of the last pass, the algorithm sets up A/D parameters to optimize phase.

Phase offset values range from 0 to 31. At the start of the A/D setup process, the first phase tested is zero. During the setup, the algorithm selects five lines spaced down the screen to be copied to a buffer for each choice of phase. The lines chosen are evenly distributed based on the current resolution setting. The last phase test line is chosen to be fifteen from the end so as to likely engage the middle of the Windows task bar if present, which guarantees many sharp transitions.

Figure 4A:
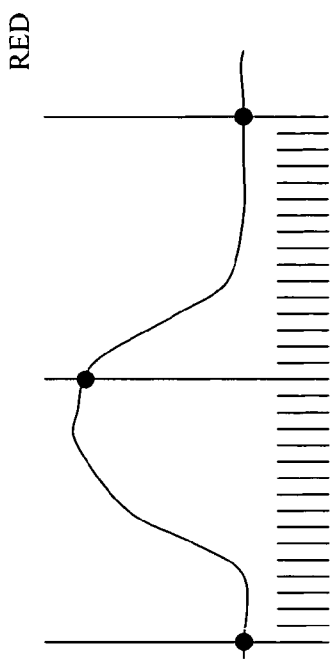
FIGS. 4(a)–4(c) depict red, green, and blue components, respectively, of an analog video signal and three representative sampling times of the A/D.
Figure 4B:
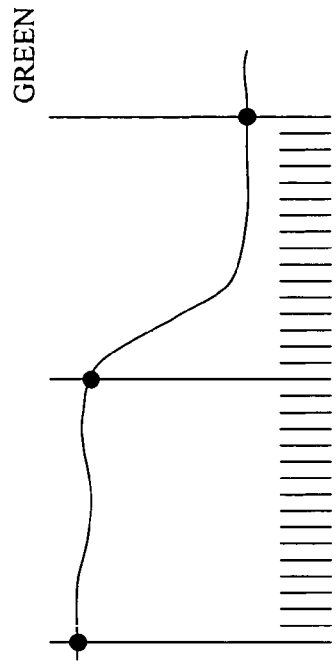
Figure 4C:
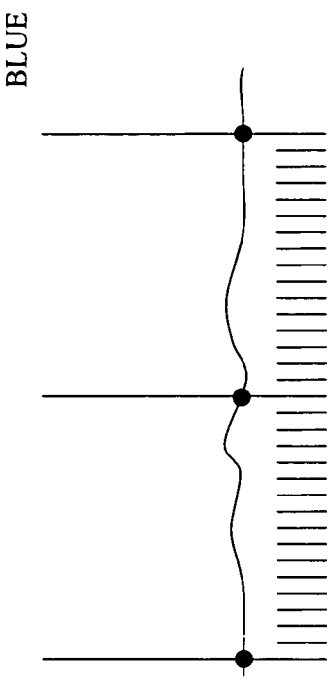

FIGS. 4(a)–4(c) depict red, green, and blue components, respectively, of an analog video signal and three representative sampling times of the A/D. The signal depicted above is typical, but the smoothness and rise time of this waveform vary significantly from computer to computer. The phase of the sampling can be adjusted along 16 different phase values as shown by the minor divisions in the diagram. There are three analog signals representing the analog video input.

After the first frame is captured, A/D setup copies all segments from previously selected lines to the buffer. There is not enough bandwidth to move all video data from the FPGA (driven by the A/D) to the CPU, so the video on a given line arrives in part from the standard video port and the remainder of the video comes across the PCI bus into the CPU. The buffer accepts samples only up to the current FIFO threshold. This makes VI (video input) memory the only source for segments and avoids having to handle the transition to FIFO memory. There is a one-to-one correspondence between pixels and segments since compression is still disabled. The five lines sampled during the A/D setup process are catenated so as to form one long string of pixels for a given frame.

This process repeats with the phase setting incrementing by a parameter (PHASEINC) until the phase setting wraps around and a frame is captured and analyzed a second time at the initial phase setting. In presently preferred embodiments the value of the parameter PHASEINC is set to 2. With the PHASEINC setting of 2, all even phase values are tested in sequence. Changing the setting to 1 causes all phase settings to be tested. That does not seem to significantly improve the accuracy of the phase optimization and also takes twice as long.

The phase is allowed to increment up to 32, which is past the limit of 31. The reason is explained below. The phase variable is allowed to be 32, but the phase setting is based only on the lower order 5 bits of the variable, zero in this case. When the value of 32 occurs however, the Horizontal Offset is increased by one to prevent the algorithm from analyzing different pixels as it increments the phase back to zero. With this offset applied, the phase setting of zero after wrapping is physically sampling at almost the same time offset as phase setting of 31 without the offset applied. Without this adjustment, changing phase from 31 to zero would result in moving the sampling alignment almost a full pixel. It would almost be the same as dropping the first pixel and adding a new pixel at the end. This, in effect, would be delaying by a pixel and thus comparing slightly different data. The horizontal offset adjustment avoids this problem.

The system can adjust the phase with frame-to-frame compression active and work to minimize the number of transmitted segments per frame, or equivalently to maximize frame rate. This optimization is effective because frame-to-frame compression works best when the same pixels sampled in successive frames produce the same sampled values. However, due to the feedback nature of frame-to-frame compression, changing the phase setting produces pixel sample values that are enough different so as to disrupt the frame-to-frame comparison. This initiates a transient response which takes many frames to settle, having a time constant of at least five frames when the phase is incremented slightly, and many more frames when the phase is changed drastically.

In order to significantly accelerate the phase adjustment process, the A/D setup phase adjust algorithm leaves frame-to-frame compression off and compares pixel values from adjacent frames directly for similarity. This simplified phase adjustment process appears to be effectively instantaneous upon each new frame. The metric is the maximum absolute difference between the values for a given pixel in successive frames with different phase settings as represented by:

$$D_i = \max_n \{|R_i - R_{i+1}| + |G_i - G_{i+1}| + |B_i - B_{i+1}|\}$$

where $D_i$ is the maximum absolute distance between pixels in frames i and i+1. R, G, and B are the red, green, and blue components of each pixel, respectively, and depend upon the pixel index n.

With the PHASEINC setting of 2, when all frames have been analyzed the algorithm has a collection of pixel vectors sampled from the frames taken with sequential phase settings. Per the above equation, the metric involves comparing frame i to frame i+1. This explains why phase zero is analyzed twice, once with the horizontal offset incremented by one. As described above, this avoids at the last iteration comparing pixels in subsequent frames with a horizontal offset error of one pixel. The metric $D_i$ is noisy, but when plotted for all phases analyzed, a good choice for the phase setting can be determined. In order to prevent the noise from creating a bad phase estimate, the algorithm first determines the longest interval in the $D_i$ values below a threshold.

The threshold is first determined by incrementing the threshold value up from zero until 25% of the metric values fall below the threshold. The metric values are then analyzed to find the longest interval below this threshold. The data is processed twice in order to deal with the case that the interval might span across the zero phase setting, requiring the process to wrap from the end to the beginning. The algorithm maintains the starting phase index and index length. Note that for the case of PHASEINC=2 that the actual phase is twice the phase index. The midpoint of the longest interval is determined and then used to determine the optimum initial phase setting.

At the end of capturing frames, A/D setup re-enables frame-to-frame compression, restores the original values of the frame-to-frame threshold, and restores the optimal horizontal offset value. Recall that the horizontal position was incremented to prevent wrapping during the phase adjustment process. When A/D setup exits, the flow of video frames to the receiver resumes and the phase tuning based on compression performance begins. The second phase tuning process continues to refine the phase estimate seeking to minimize the number of segments per frame. This strategy achieves the same objective as the prior implementation of A/D setup. Secondary phase adjustment runs in the background for 200 frames with live video running to the remote unit. It adjusts the phase and monitors the number of segments required to transmit the frame.

As discussed above, there is a long settle time associated with changing the phase when frame-to-frame compression is active. Releasing the video flow provides the perception of a fast execution of the A/D setup process and allows the secondary phase adjustment process time after initial setup completes to operate within the settling time requirement. Secondary phase adjustment incrementally adjusts the phase back and forth around the current setting in search of a better phase value. The video toggles back and forth slightly, so it is not desirable for the phase process to run indefinitely. Currently the phase adjustment process runs for 200 frames and then shuts off. Reactivating A/D setup either manually from the OSD display screen or automatically as a new resolution or new source is detected causes secondary phase adjust to run again after initial A/D setup completes. The toggling video is acceptable for a few seconds because the user is accustomed to systems that improve display quality during the first few seconds of a new signal source.

Secondary phase adjust runs by adjusting the phase and noting the number of segments required to transmit the video, dealing with the transient by waiting five frames before recording the frame segment count. The search pattern used is {−2, −1, 0, 1, 2}, meaning that if the current phase setting is P, the algorithm sets the phase to P−2, P−1, P, P+1, and P+2 taking into account wrapping if P+1 or P+2 is over 31 or if P−2 or P−1 is negative. Secondary phase adjust thus takes 25 frames to execute and collect the segment counts for the five phase settings. It then selects the phase setting P' producing the lowest segment count and starts again using the new P value of P'.

This search pattern has been observed to stall in some cases. If the initial phase setting is, for some reason, at the worst possible performance point, the curve there tends to be flat such that neighboring phase settings produce equally high segment counts. In such a case, the algorithm may not approach the optimum phase setting producing a minimized segment counts. An alternative pattern {−4, −1, 0, 1, 4} has been shown to solve this problem by looking out further in the search. In an hybrid approach the secondary phase adjust begins using the wide pattern initially and continues to do so as long as the +4 or −4 increments are being chosen. Once the −1, 0, and +1 increments are being chosen, the hybrid algorithm can narrow the search to the original pattern {−2, −1, 0, 1, 2}. The algorithm can incorporate more than five increment values, but this increases execution time.

Generally, as contemplated by the inventors, and as one skilled in the art would recognize, a target computer may be any processor or collection of processors. By way of example, a target computer may be a processor or collection of processors or logic elements located (or embedded) in a server, a desktop computer (such as a PC, Apple Macintosh or the like), a kiosk, an ATM, a switch, a set-top box, an appliance (such as a television, DVR, DVD player and the like), a vehicle, an elevator, or a manufacturing or processing production line. A collection of target computers may, e.g., be a collection of servers in a rack or some other collection. They may be independent of each other or connected to each other in a network or by some other structure.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. In a wireless keyboard-video-mouse ("KVM") system in which a remote computer accesses the video output data of a target computer, a method of providing video data from the target computer to the remote computer, the method comprising:
    obtaining an analog video signal from a target computer;
    disabling data compression of the video signal;
    determining a first phase for analog-to-digital (A/D) conversion of the video signal;
    beginning compression of the video signal; and
    adjusting the first phase of the A/D conversion to produced a second phase, based, at least in part, on a quality measure of the compressed video signal.

2. A method as in claim 1 wherein the quality measure includes a number of segments required to transmit the compressed video signal.

3. A method as in claim 2 wherein the adjusted phase setting selected is one which produces the lowest segment count of a plurality of tested phases.

4. A method as in claim 1 wherein the first phase is phase P, the method further comprising:
    testing phases P−2, P−1, P, P+1, and P+2; and
    selecting as the adjusted phase, that phase from the phases P−2, P−1, P, P+1, and P+2 that produces the lowest segment count.

5. In a wireless keyboard-video-mouse ("KVM") system in which a remote computer accesses the video output data of a target computer, a method of providing video data from the target computer to the remote computer, the method comprising:
    (A) obtaining an analog video signal from a target computer;
    (B) disabling data compression of the video signal;
    (C) determining a first phase (P) for analog-to-digital (A/D) conversion of the video signal;
    (D) beginning compression of the video signal; and
    (E) adjusting the first phase of the A/D conversion to produced a second phase (P'), based, at least in part, on a number of segments required to transmit the compressed video signal, wherein the adjusted phase setting selected is one which produces the lowest segment count of a plurality of tested phases, the adjusting comprising:
        (e1) testing phases P−2, P−1, P, P+1, and P+2; and
        (e2) selecting as the adjusted phase, that phase from the phases P−2, P−1, P, P+1, and P+2 that produces the lowest segment count.

* * * * *